United States Patent
Shiga et al.

(10) Patent No.: US 8,858,358 B2
(45) Date of Patent: Oct. 14, 2014

(54) TUBULAR BODY MADE OF FIBER-REINFORCED EPOXY RESIN MATERIAL

(71) Applicant: Dunlop Sports Co., Ltd., Kobe (JP)

(72) Inventors: Kazuyoshi Shiga, Kobe (JP); Yasuo Naito, Kobe (JP)

(73) Assignee: Dunlop Sports Co. Ltd., Kobe (JP)

( * ) Notice: Subject to any disclaimer, the term of this patent is extended or adjusted under 35 U.S.C. 154(b) by 66 days.

(21) Appl. No.: 13/729,327

(22) Filed: Dec. 28, 2012

(65) Prior Publication Data

US 2013/0172098 A1 Jul. 4, 2013

(30) Foreign Application Priority Data

Dec. 29, 2011 (JP) .................. 2011-290328

(51) Int. Cl.
 *A63B 53/10* (2006.01)
(52) U.S. Cl.
 USPC .......................... 473/319; 428/36.3; 428/36.9
(58) Field of Classification Search
 CPC ..................................................... A63B 53/10
 USPC ................ 473/319, 320, 567; 428/36.3, 36.9; 264/635; 156/187–188
 See application file for complete search history.

(56) References Cited

U.S. PATENT DOCUMENTS

| | | | | |
|---|---|---|---|---|
| 6,379,799 B1* | 4/2002 | Almen | ........................... | 428/413 |
| 6,831,112 B2* | 12/2004 | Kaku et al. | .................... | 521/174 |
| 8,394,491 B2* | 3/2013 | Arai et al. | .................. | 428/297.4 |
| 8,470,435 B2* | 6/2013 | Takano et al. | .............. | 428/297.4 |
| 8,486,518 B2* | 7/2013 | Takano et al. | .............. | 428/297.4 |
| 8,487,052 B2* | 7/2013 | Kobayashi et al. | ........... | 525/531 |
| 8,668,983 B2* | 3/2014 | Kawazoe et al. | .......... | 428/297.4 |
| 8,728,626 B2* | 5/2014 | Nemoto et al. | ............... | 428/504 |
| 2007/0196648 A1* | 8/2007 | Endo et al. | ..................... | 428/367 |
| 2011/0287246 A1* | 11/2011 | Arai et al. | .................. | 428/300.1 |
| 2013/0344325 A1* | 12/2013 | Nguyen et al. | ................ | 428/343 |
| 2014/0065390 A1* | 3/2014 | Le Gall et al. | ................ | 428/215 |

FOREIGN PATENT DOCUMENTS

| JP | 8-337707 | * | 12/1996 |
|---|---|---|---|
| JP | 8-337707 A | | 12/1996 |
| JP | 9-85844 A | | 3/1997 |
| JP | 2001-54602 A | | 2/2001 |
| JP | 2003-103519 A | | 4/2003 |
| JP | 2009-74009 A | | 4/2009 |

OTHER PUBLICATIONS

Korean Office Action dated Apr. 21, 2014 for Korean Patent Application No. 10-2012-0148372.

* cited by examiner

*Primary Examiner* — Stephen L. Blau
(74) *Attorney, Agent, or Firm* — Birch, Stewart, Kolasch & Birch, LLP (57) ABSTRACT

It is an object to provide a tubular body made from a novel fiber-reinforced epoxy resin material having improved strength. A tubular body made of a fiber-reinforced epoxy resin material according to the present invention is a tubular body made of a fiber-reinforced epoxy resin material comprising a cured product of an epoxy resin composition and a reinforcing fiber. The cured product of the epoxy resin composition has a swelling ratio of 20% by mass to 42.5% by mass in methyl ethyl ketone.

20 Claims, 3 Drawing Sheets

TUBULAR BODY MADE OF FIBER-REINFORCED EPOXY RESIN MATERIAL

FIELD OF THE INVENTION

The present invention relates to a tubular body made of a fiber-reinforced epoxy resin material, and more specifically, relates to improvement in the strength of a tubular body made of a fiber-reinforced epoxy resin material.

DESCRIPTION OF THE RELATED ART

A tubular body made of a fiber-reinforced epoxy resin material is used for a golf club shaft or a fishing rod. For example, Japanese Patent Publication No. 2003-103519 A discloses a tubular body including a fiber-reinforced composite material layer that is obtained by heating and curing a prepreg sheet comprising a reinforcing fiber oriented in one direction and an epoxy resin composition, wherein a tensile modulus E (GPa) of the reinforcing fiber and a six-degree compressive strength σ (MPa) of the fiber-reinforced composite material obtained by heating and curing meet the following formulas (1) and (2).

$$200\ GPa \leq E \leq 950\ GPa \quad (1)$$

$$-3.6E + 2000 \leq \sigma \leq -3.6E + 2600 \quad (2)$$

Japanese Patent Publication No. 2001-54602 A discloses a golf club shaft that is formed by using a fiber-reinforced composite material comprising, as a component, a reinforcing fiber having a tensile modulus of 200 to 800 GPa and an epoxy resin composition that comprises a curing agent and a following component [A] and/or component [B], wherein a tensile modulus of a cured product of the epoxy resin composition is from 3.4 to 4.4 GPa, and a cutting amount of the fiber-reinforced composite material that is cut by wet cutting is not greater than 3% by weight.

[A] a compound having one functional group that can react with an epoxy resin or a curing agent, and one or more amide bond within a molecule thereof.

[B] a polyester polyurethane having an aromatic ring within a molecule thereof.

Japanese Patent Publication No. H9-85844 A discloses a tubular body made of a fiber-reinforced plastic that is composed of a reinforcing fiber and a matrix resin, and the matrix resin is a cured product of an epoxy resin composition composed of the following components [A], [B], and [C].

[A] an epoxy resin comprising a difunctional epoxy resin in an amount of 70 parts by weight or more per 100 parts by weight of the epoxy resin

[B] fine particles that contain a rubber phase and that are substantially insoluble in an epoxy resin

[C] a curing agent

Japanese Patent Publication No. H8-337707 A discloses: a fiber-reinforced composite material composed of a reinforcing fiber and a cured product of a fiber-reinforced composite material epoxy resin composition comprising at least following components [A], [B], and [C]; and a golf shaft made of the fiber-reinforced composite material.

[A] an epoxy resin comprising a difunctional epoxy resin in an amount of 70 parts by weight or more per 100 parts by weight of the epoxy resin

[B] a polyester or polyamide thermoplastic elastomer

[C] a curing agent or a blend of a curing agent and a curing accelerator

With the higher performance and higher quality of a golf club, a fishing rod, and the like, the strength of the above-described tubular body made of the fiber-reinforced composite material has become insufficient. The present invention has been made in view of the above-described circumstances, and an object of the present invention is to provide a tubular body made of a novel fiber-reinforced epoxy resin material having improved strength.

SUMMARY OF THE INVENTION

The mechanical strength of a fiber-reinforced composite material is affected by the strength of the interface between a reinforcing fiber and a matrix resin. The inventors of the present invention have studied to improve the strength of the interface between a reinforcing fiber and a matrix resin and have achieved the present invention. That is, the present invention, which can solve the above problem, provides a tubular body made of a fiber-reinforced epoxy resin material comprising a cured product of an epoxy resin composition and a reinforcing fiber, wherein the cured product of the epoxy resin composition has a swelling ratio in a range from 20 mass % to 42.5 mass % in methyl ethyl ketone. The swelling ratio in methyl ethyl ketone is an index of the crosslinking density of the epoxy resin composition. The cured product of the epoxy resin composition having a swelling ratio in methyl ethyl ketone within the above range has an appropriate elongation and gives excellent adhesion to the reinforcing fiber. As a result, the effect of the reinforcement with the reinforcing fiber is increased and the mechanical strength of the obtained fiber-reinforced epoxy resin material is further improved.

The tubular body made of the fiber-reinforced epoxy resin material according to the present invention has excellent bending strength.

DESCRIPTION OF THE PREFERRED EMBODIMENT

The present invention is directed to a tubular body made of a fiber-reinforced epoxy resin material comprising a cured product of an epoxy resin composition and a reinforcing fiber, wherein the cured product of the epoxy resin composition has a swelling ratio in a range from 20 mass % to 42.5 mass % in methyl ethyl ketone.

In the present invention, the swelling ratio of the cured product of the epoxy resin composition in methyl ethyl ketone is preferably 20 mass % or more, more preferably 25 mass % or more, and is preferably 42.5 mass % or less and more preferably 38 mass % or less. The swelling ratio in methyl ethyl ketone is an index of the crosslinking degree of the cured product of the epoxy resin composition. If the swelling ratio falls within a range from 20 mass % to 42.5 mass %, a resin having a crosslinking density that provides an appropriate elongation to improve the interface strength is provided.

Next, the epoxy resin composition used in the present invention will be described. The epoxy resin composition preferably comprises, as an epoxy resin component, an epoxy resin having two epoxy groups within the molecule, namely, a difunctional epoxy resin. Specific examples of the difunctional epoxy resin include bisphenol type epoxy resins such as a bisphenol A type epoxy resin or a hydrogenated product thereof, a bisphenol F type epoxy resin or a hydrogenated product thereof, a bisphenol S type epoxy resin, a tetrabromobisphenol A type epoxy resin, and a bisphenol AD type epoxy resin. The bisphenol type epoxy resins may be used solely, or as a mixture of two or more of them.

In the present invention, a bisphenol A type epoxy resin and a bisphenol F type epoxy resin are preferably used in combination as the bisphenol type epoxy resin. Use of the bisphenol A type epoxy resin and the bisphenol F type epoxy resin in combination improves the bending strength of the obtained tubular body. The content ratio of the bisphenol A type epoxy resin to the bisphenol F type epoxy resin is preferably from 20:80 to 80:20, more preferably 30:70 to 70:30, and even more preferably 40:60 to 60:40, in mass ratio.

The epoxy equivalent (g/eq) of the bisphenol type epoxy resins is preferably 200 or more, and more preferably 250 or more, and is preferably 400 or less, and more preferably 350 or less. If the epoxy equivalent of the bisphenol type epoxy resins is less than 200, the epoxy resin component is in a liquid state at normal temperature, and it may be difficult to produce or mold a prepreg. On the other hand, if the epoxy equivalent is greater than 400, the epoxy resin component is in a solid state at normal temperature and molding may be difficult.

Specific examples of the bisphenol A type epoxy resin include "jER (registered trademark)" 827, "jER (registered trademark)" 828, "jER (registered trademark)" 1001, "jER (registered trademark)" 1002, "jER (registered trademark)" 1003, "jER (registered trademark)" 1003F, "jER (registered trademark)" 1004, "jER (registered trademark)" 1004FS, "jER (registered trademark)" 1004F, "jER (registered trademark)" 1004AF, "jER (registered trademark)" 1055, "jER (registered trademark)" 1005F, "jER (registered trademark)" 1006FS, "jER (registered trademark)" 1007, "jER (registered trademark)" 1007FS, "jER (registered trademark)" 1008, and "jER (registered trademark)" 1009 (all of them are manufactured by Mitsubishi Chemical Corporation), "Epotohto (registered trademark)" YD-011, "Epotohto (registered trademark)" YD-012, "Epotohto (registered trademark)" YD-013, "Epotohto (registered trademark)" YD-014, "Epotohto (registered trademark)" YD-017, "Epotohto (registered trademark)" YD-019, "Epotohto (registered trademark)" YD-020N, and "Epotohto (registered trademark)" YD-020H (all of them are manufactured by Tohto Kasei Co., Ltd.), "Epicron (registered trademark)" 1050, "Epicron (registered trademark)" 3050, "Epicron (registered trademark)" 4050, and "Epicron (registered trademark)" 7050 (all of them are manufactured by DIC Corporation), EP-5100, EP-5400, EP-5700, and EP-5900 (all of them are manufactured by ADEKA Corporation), and DER-661, DER-663U, DER-664, DER-667, DER-668, and DER-669 (all of them are manufactured by the Dow Chemical Company).

Specific examples of the bisphenol F type epoxy resin include "jER (registered trademark)" 806, "jER (registered trademark)" 807, "jER (registered trademark)" 4005P, "jER (registered trademark)" 4007P, and "jER (registered trademark)" 4010P (all of them are manufactured by Mitsubishi Chemical Corporation).

In addition to the epoxy resin having two epoxy groups within the molecule, the epoxy resin composition used in the present invention preferably further comprises a multifunctional epoxy resin having three or more epoxy groups within the molecule. If the multifunctional epoxy resin is comprised, the crosslinking density of the cured product of the epoxy resin composition can be controlled. It is thought that the strength of the interface between the reinforcing fiber and the epoxy resin is improved by controlling the crosslinking density and making the elongation of the cured product of the epoxy resin composition fall within an appropriate range.

The multifunctional epoxy resin is not particularly limited, and examples thereof include novolac type epoxy resins such as a phenolic novolac type epoxy resin and an o-cresol novolac type epoxy resin; glycidyl ether type epoxy resins such as triglycidyl ether of tris(p-hydroxyphenyl)methane and a derivative thereof, tetraglycidyl ether of tetrakis(p-hydroxyphenyl)ethane and a derivative thereof, triglycidyl ether of glycerin, and tetraglycidyl ether of pentaerythritol; and glycidyl amine type epoxy resins such as tetraglycidyl diaminodiphenylmethane, tetraglycidyl-m-xylylenediamine, and triglycidyl-m-aminophenol.

As the multifunctional epoxy resin, novolac type epoxy resins such as a phenolic novolac type epoxy resin and an o-cresol novolac type epoxy resin are preferable. The content of a novolac type epoxy resin in the entire epoxy resin components contained in the epoxy resin composition is preferably 3 mass % or more, more preferably 5 mass % or more, and even more preferably 7 mass % or more, and is preferably 19 mass % or less, more preferably 15 mass % or less, and even more preferably 10 mass % or less. If the content of the novolac type epoxy resin falls within the above range, the obtained cured product has improved strength.

The epoxy equivalent (g/eq) of the multifunctional epoxy resin is preferably 50 or more, more preferably 75 or more, and even more preferably 100 or more, and is preferably 500 or less, more preferably 400 or less, and even more preferably 300 or less. If the epoxy equivalent of the multifunctional epoxy resin falls within the above range, a crosslinked structure can be effectively formed.

Examples of commercial products of phenolic novolac type epoxy resins include "jER (registered trademark)" 152 and "jER (registered trademark)" 154 (both of them are manufactured by Mitsubishi Chemical Corporation), "Epicron (registered trademark)" N-740, "Epicron (registered trademark)" N-770, and "Epicron (registered trademark)" N-775 (all of them are manufactured by DIC Corporation), PY307, EPN1179, and EPN1180 (all of them are manufactured by Huntsman Advanced Materials, Inc.), YDPN638 and YDPN638P (both of them are manufactured by Tohto Kasei Co., Ltd.), DEN431, DEN438, and DEN439 (all of them are manufactured by the Dow Chemical Company), EPR600 (manufactured by Bakelite AG), and EPPN-201 (manufactured by NIPPON KAYAKU Co., LTD.).

The epoxy resin composition used in the present invention preferably comprises a curing agent. The curing agent includes, for example, dicyandiamide; aromatic amines having an active hydrogen such as 4,4'-diaminodiphenylmethane, 4,4'-diaminodiphenylsulfone, 3,3'-diaminodiphenylsulfone, m-phenylenediamine, and m-xylylenediamine; aliphatic amines having an active hydrogen such as diethylenetriamine, triethylenetetramine, isophoronediamine, bis(aminomethyl)norbornane, bis(4-aminocyclohexyl)methane, and dimer acid ester of polyethyleneimine; modified amines obtained by reacting compounds such as an epoxy compound, acrylonitrile, phenol and formaldehyde, and thiourea, with these amines having an active hydrogen; tertiary amines having no active hydrogen such as dimethylaniline, triethylenediamine, dimethylbenzylamine, and 2,4,6-tris(dimethylaminomethyl)phenol; imidazoles such as 2-methylimidazole and 2-ethyl-4-methylimidazole; polyamide resins; carboxylic anhydrides such as hexahydrophthalic anhydride, tetrahydrophthalic anhydride, methylhexahydrophthalic anhydride, and methylnadic anhydride; polycarboxylic acid hydrazides such as adipic acid hydrazide and naphthalene dicarboxylic acid hydrazide; polyphenol compounds such as novolac resins; polymercaptans such as ester of thioglycolic acid and polyol; Lewis acid complexes such as a boron trifluoride ethylamine complex. Among them, dicyandiamide is preferably used as the curing agent.

The added amount of dicyandiamide is preferably 13 g or more, more preferably 15 g or more, and even more preferably 17 g or more, and is preferably 40 g or less, more preferably 38 g or less, and even more preferably 35 g or less with respect to 1 mole of the epoxy group of the epoxy resin component. If the added amount of dicyandiamide falls within the above range, the mechanical properties of the cured product of the epoxy resin composition become better.

In combination with the curing agent, an appropriate curing accelerator can be used for enhancing the curing activity. As the curing accelerator, a urea derivative in which at least one of the hydrogens bonded to urea is substituted with a hydrocarbon group is preferred. The hydrocarbon group may be further substituted with, for example, a halogen atom, a nitro group, an alkoxy group, or the like. Examples of the urea derivative include derivatives of mono-urea compounds such as 3-phenyl-1,1-dimethylurea, 3-(parachlorophenyl)-1,1-dimethylurea, 3-(3,4-dichlorophenyl)-1,1-dimethylurea, 3-(orthomethylphenyl)-1,1-dimethylurea, 3-(paramethylphenyl)-1,1-dimethylurea, 3-(methoxyphenyl)-1,1-dimethylurea, and 3-(nitrophenyl)-1,1-dimethylurea; and derivatives of bis-urea compounds such as N,N-phenylene-bis(N', N'-dimethylurea) and N,N-(4-methyl-1,3-phenylene)-bis(N', N'-dimethylurea). Examples of a preferable combination include combinations of dicyandiamide with, as curing accelerators, urea derivatives such as 3-phenyl-1,1-dimethylurea, 3-(3,4-dichlorophenyl)-1,1-dimethylurea (DCMU), 3-(3-chloro-4-methylphenyl)-1,1-dimethylurea, and 2,4-bis(3,3-dimethylureido)toluene. Among them, a combination of dicyandiamide with 3-(3,4-dichlorophenyl)-1,1-dimethylurea (DCMU) as a curing accelerator is more preferred.

In the present invention, preferably used is dicyandiamide (DICY) as a curing agent and a urea derivative as a curing accelerator. In this case, the content ratio of dicyandiamide (DICY) to the urea derivative is preferably 1 or more, more preferably 1.2 or more, and even more preferably 1.5 or more, and is preferably 3 or less, more preferably 2.8 or less, and even more preferably 2.5 or less, in mass ratio (DICY/urea derivative). In addition, the mass ratio (DICY/urea derivative) is most preferably 2. If the mass ratio of DICY/urea derivative falls within the above range, the curing rate is high and the cured product has better properties.

The epoxy resin composition of the present invention may further comprise other components such as an oligomer, a high-molecular-weight compound, and organic or inorganic particles.

Examples of an oligomer that can be blended in the epoxy resin composition used in the present invention include a polyester polyurethane having a polyester backbone and a polyurethane backbone, a urethane (meth)acrylate having a polyester backbone and a polyurethane backbone and further having a (meth)acrylate group at a terminal of the molecular chain, and an indene oligomer.

As a high-molecular-weight compound that can be blended in the epoxy resin composition used in the present invention, a thermoplastic resin is suitably used. If the thermoplastic resin is blended, controllability of the viscosity of the resin, controllability of the handling of a prepreg sheet, and an effect of adhesion improvement are enhanced. Thus, blending of the thermoplastic resin is preferred.

Examples of the thermoplastic resin include polyvinyl acetal resins such as polyvinyl formal and polyvinyl butyral, polyvinyl alcohols, phenoxy resins, thermoplastic resins having amide bonds such as polyamide and polyimide, and thermoplastic resins having a sulfonyl group such as polysulfone. Each of polyamide, polyimide, and polysulfone may have ether linkage and a functional group such as a carbonyl group in the main chain. Polyamide may have a substituent on the nitrogen atom of an amide group. The epoxy resin composition used in the present invention preferably comprises polyvinyl formal as a thermoplastic resin.

The amount of the thermoplastic resin is preferably 2 parts by mass or more, more preferably 3 parts by mass or more, and even more preferably 4 parts by mass or more, and is preferably 12 parts by mass or less and more preferably 8 parts by mass or less with respect to 100 parts by mass of the epoxy resin component. If the amount of the thermoplastic resin is 2 parts by mass or more, the epoxy resin composition has better elongation and tackiness can be provided thereto. On the other hand, if the amount of the thermoplastic resin exceeds 12 parts by mass, the epoxy resin composition may be solidified at normal temperature. Thus, the impregnation to a reinforcing fiber may be lowered and a void may be caused during the production of a prepreg.

As organic particles that can be blended in the epoxy resin composition used in the present invention, rubber particles and thermoplastic resin particles are preferably used. These particles provide effects of improving the toughness of the resin and improving the impact resistance of a fiber-reinforced composite material. Furthermore, as rubber particles, crosslinked rubber particles and core-shell rubber particles in which a different type of polymer is graft-polymerized on the surfaces of crosslinked rubber particles are preferably used.

As commercially-available crosslinked rubber particles, XER-91 (manufactured by JSR Corporation) composed of a crosslinked product of a carboxyl-modified butadiene-acrylonitrile copolymer, CX-MN series (manufactured by Nippon Shokubai Co., Ltd.) composed of acrylic rubber fine particles, YR-500 series (manufactured by Tohto Kasei Co., Ltd.), and the like can be used. As commercially-available core-shell rubber particles, PARALOID EXL-2655 (manufactured by Kureha Corporation) composed of a butadiene-alkyl methacrylate-styrene copolymer, Staphyloid AC-3355 and TR-2122 (manufactured by Takeda Pharmaceutical Company Limited) composed of an acrylic acid ester-methacrylic acid ester copolymer, PARALOID EXL-2611 and EXL-3387 (registered trademarks, trade names, manufactured by Rohm and Haas Company) composed of a butyl acrylate-methyl methacrylate copolymer, and the like can be used.

In addition, as thermoplastic resin particles, particles of polyamide or polyimide are preferably used. As commercially-available polyamide particles, trade name SP-500 manufactured by Toray Industries Inc., Orgasol (registered trademark) manufactured by Elf Atochem, and the like can be used.

As inorganic particles, silica, alumina, smectite, synthetic mica, and the like can be blended in the epoxy resin composition. These inorganic particles are blended with the epoxy resin composition, mainly in order to control rheology, namely, to increase the viscosity, and to impart thixotropy.

The tensile strength (strength at break) of the cured product of the epoxy resin composition used in the present invention is preferably 20 MPa or more, more preferably 30 MPa or more, and even more preferably 50 MPa or more, and is preferably 500 MPa or less, more preferably 450 MPa or less, and even more preferably 400 MPa or less. In addition, the elongation (elongation at break) of the cured product of the epoxy resin composition is preferably 2% or more and more preferably 3% or more, and is preferably 300% or less and more preferably 100% or less. Measurement of the tensile strength and the elongation will be described later.

The resin component of the tubular body made of the fiber-reinforced epoxy resin material according to the present invention preferably consists essentially of the above epoxy resin composition, but a commercially-available epoxy resin composition may be used in combination as long as it does not impair the effect of the present invention. When the commercially-available epoxy resin composition is used in combination, the content of the commercially-available epoxy resin composition in the resin component of the tubular body made of the fiber-reinforced epoxy resin material is preferably 95 mass % or less, more preferably 90 mass % or less, and even more preferably 80 mass % or less.

Examples of the reinforcing fiber used for the fiber-reinforced epoxy resin material in the present invention include a carbon fiber, a glass fiber, an aramid fiber, a boron fiber, an alumina fiber, and a silicon carbide fiber. In addition, two or more of these fibers can be mixed. Among them, the carbon fiber is preferably used.

Examples of the carbon fiber include carbon fibers such as acrylic type, pitch type, and rayon type. Among them, acrylic type carbon fiber having high tensile strength is preferred. As the form of the carbon fiber, so-called twisted yarn, which is the carbon fiber obtained by twisting and baking a precursor fiber, so-called untwisted yarn, which is a carbon fiber obtained by untwisting the twisted yarn, non-twisted yarn obtained by conducting thermal treatment on a precursor fiber without substantially twisting the precursor fiber, and the like can be used. The non-twisted yarn or the untwisted yarn is preferable in view of balance between the moldability and the strength properties of the fiber-reinforced composite material, and the non-twisted yarn is more preferable in terms of handling such as adhesion between prepreg sheets. In addition, the carbon fiber in the present invention can also include a graphite fiber.

The tensile modulus of the reinforcing fiber is preferably 10 $t/mm^2$ or more and more preferably 24 $t/mm^2$ or more, and is preferably 70 $t/mm^2$ or less and more preferably 50 $t/mm^2$ or less. The tensile modulus is measured according to JISR7601:1986 "testing methods for carbon fibers". When the tensile modulus of the reinforcing fiber falls within the above range, a tubular body having high bending strength is obtained.

The content of the reinforcing fiber in the tubular body made of the fiber-reinforced epoxy resin material according to the present invention is preferably 65 mass % or more, and more preferably 70 mass % or more, and is preferably 80 mass % or less, and more preferably 75 mass % or less. This is because if the content of the reinforcing fiber falls within the above range, a favorable fiber-reinforced epoxy resin material utilizing the high strength of the resin sufficiently is provided.

In the present invention, a known method is used to manufacture the tubular body made of the fiber-reinforced epoxy resin material. Exemplified is a method in which a prepreg is produced by impregnating the epoxy resin composition to the reinforcing fiber such as a carbon fiber, cutting the prepreg into the shape of each material constituting the tubular body, laminating each material, and then pressuring the laminated while heating.

The prepreg can be produced by a method such as a wet method in which the epoxy resin composition is dissolved in a solvent such as methyl ethyl ketone and methanol to decrease the viscosity thereof and impregnated to the reinforcing fiber, and a hot-melt method in which the epoxy resin composition is heated to decrease the viscosity thereof and impregnated to the reinforcing fiber. The wet method is a method in which the reinforcing fiber is immersed in a solution of the epoxy resin composition, then pulled out, and heated with an oven or the like to evaporate the solvent, thereby obtaining a prepreg. The hot-melt method includes a method in which the epoxy resin composition whose viscosity has been decreased by heating is directly impregnated to the reinforcing fiber, and a method in which a film where a releasing paper or the like is coated with the epoxy resin composition is previously produced, laminated on both sides or one side of the reinforcing fiber, and heated to impregnate the epoxy resin composition, thereby obtaining a prepreg. The hot-melt method is preferred since the solvent substantially does not remain in the prepreg.

The method of applying pressure to a laminate of prepregs while heating the laminate includes a wrapping tape method and an inner-pressure molding method. The wrapping tape method is a method in which prepregs are wound around a core roller such as a mandrel to obtain a molded body. Specifically, the prepregs are wound around the mandrel, a wrapping tape composed of a thermoplastic resin film is wound around the outside of the prepregs for fixing the prepregs and providing pressure to the prepregs, the resin is heated in an oven to be cured, and then, the core roller is removed to obtain a tubular molded body. The surface of the tubular molded body may be cut and painting or the like may be conducted on the tubular molded body.

The inner-pressure molding method is a method in which prepregs are wound around an inner-pressure provider, such as a tube made of a thermoplastic resin, to make a preform, then this is placed in a mold, and a high-pressure gas is introduced into the inner-pressure provider while the mold is heated, to conduct molding.

Examples of the form of the reinforcing fiber in the prepreg include a long fiber oriented in one direction, a bidirectional woven product, a multiaxial woven product, a nonwoven fabric, a mat, a knit, and a braid. Here, the long fiber means a single fiber or fiber bundle substantially continuous for 10 mm or more. A so-called unidirectional prepreg in which a long fiber is oriented in one direction can highly utilize the strength in the fiber direction, because the fibers have the same direction and less bends. In addition, with regard to the unidirectional prepreg, when a plurality of prepregs are appropriately laminated such that the arrangement directions of the reinforcing fibers thereof are different from each other and then molding is conducted, designing the elastic modulus and the strength of a molded product in each direction becomes easy.

The number of laminated prepregs constituting the tubular body made of the fiber-reinforced epoxy resin material, the content of the reinforcing fiber, the thickness of each prepreg, and the like are preferably changed as appropriate according to a desired property. In particular, required rigidity and strength are preferably provided to the tubular body by appropriately arranging a bias prepreg whose reinforcing fiber is arranged so as to be tilted relative to the axis of the tubular body, a straight prepreg whose reinforcing fiber is arranged parallel to the axis of the tubular body, and a hoop prepreg whose reinforcing fiber is arranged perpendicular to the axis of the tubular body.

Furthermore, a fiber-reinforced composite material can be obtained without using any prepreg which is an intermediate base material. Specifically, a tubular molded body is also obtained by a filament winding molding method in which the epoxy resin composition is impregnated into a roving of the reinforcing fiber and the roving is taken up and wound on a core roller, then the resin is heated and cured. The surface of the tubular molded body may be cut and painting or the like may be conducted on the tubular molded body.

EXAMPLES

Hereinafter, the present invention will be described in detail by way of examples. The present invention is not limited to examples described below. Various changes and modifications can be made without departing from the spirit and scope of the present invention.

[Evaluation Method]
[Production of Test Piece for Tensile Test of the Epoxy Resin Composition and Test Piece for Swelling Test in Methyl Ethyl Ketone]

Methyl ethyl ketone (MEK) solutions of epoxy resins were prepared by dissolving epoxy resins in MEK so as to have each epoxy resin composition shown in Tables 1 and 2 (MEK content: 30% by mass). The obtained MEK solutions of epoxy resins were dried and heated to melt, and a curing agent and a curing accelerator were added thereto, followed by stirring. The obtained epoxy resin compositions were poured into a 2 mm-thick casting mold and treated at 130° C. for 2 hours to be cured, respectively. A test piece for tensile test was molded from the cured resin plate according to JIS-K7162 test piece 1BA. In addition, a test piece having a square shape of 2 cm×2 cm was cut out to make a test piece for methyl ethyl ketone swelling test.

[Test Piece for Tensile Test of Fiber-Reinforced Epoxy Resin Material]

Methyl ethyl ketone (MEK) solutions of epoxy resins were prepared by dissolving epoxy resins in MEK so as to have each composition shown in Tables 1 and 2 (MEK content: 30% by mass). A curing agent and a curing accelerator were added to the obtained MEK solutions of epoxy resins, followed by stirring, to prepare solutions of an epoxy resin compositions. The solutions of the epoxy resin compositions were applied to the releasing paper and dried at 80 to 90° C. for 3 minutes to produce epoxy resin composition sheets. The obtained epoxy resin composition sheets were impregnated into carbon fiber sheets having a fiber mass of per unit area of 100 g/m$^2$ by a hot-melt method, to produce prepregs having a carbon fiber content of 70 mass %. The obtained prepregs were cut and ten pieces were laminated in one direction. The laminate was sandwiched between 0.1 mm-thick releasing sheets, and pressed with a 1 mm spacer under the conditions of 80° C.×30 minutes+130° C.×2 hours to cure the epoxy resins, thereby obtaining fiber-reinforced epoxy resin material sheets. The obtained fiber-reinforced epoxy resin material sheets were cut into a size of 100 mm length in the direction perpendicular to the fiber and 10 mm wide in the fiber direction, to produce test pieces for tensile test.

[Production of Tubular Body Made of Fiber-Reinforced Epoxy Resin Material]

Methyl ethyl ketone (MEK) solutions of epoxy resins were prepared by dissolving epoxy resins in MEK so as to have each composition shown in Tables 1 and 2 (MEK content: 30% by mass). A curing agent and a curing accelerator were added to the obtained MEK solutions of epoxy resins and stirred, to prepare solutions of epoxy resin compositions. The solutions of the epoxy resin compositions were applied to the releasing paper and dried to produce epoxy resin composition sheets. The obtained epoxy resin composition sheets were impregnated into carbon fiber sheets having a fiber mass per unit area of 100 g/m$^2$ by a hot-melt method, to produce prepregs having a carbon fiber content of 70 mass %.

Figure 1:
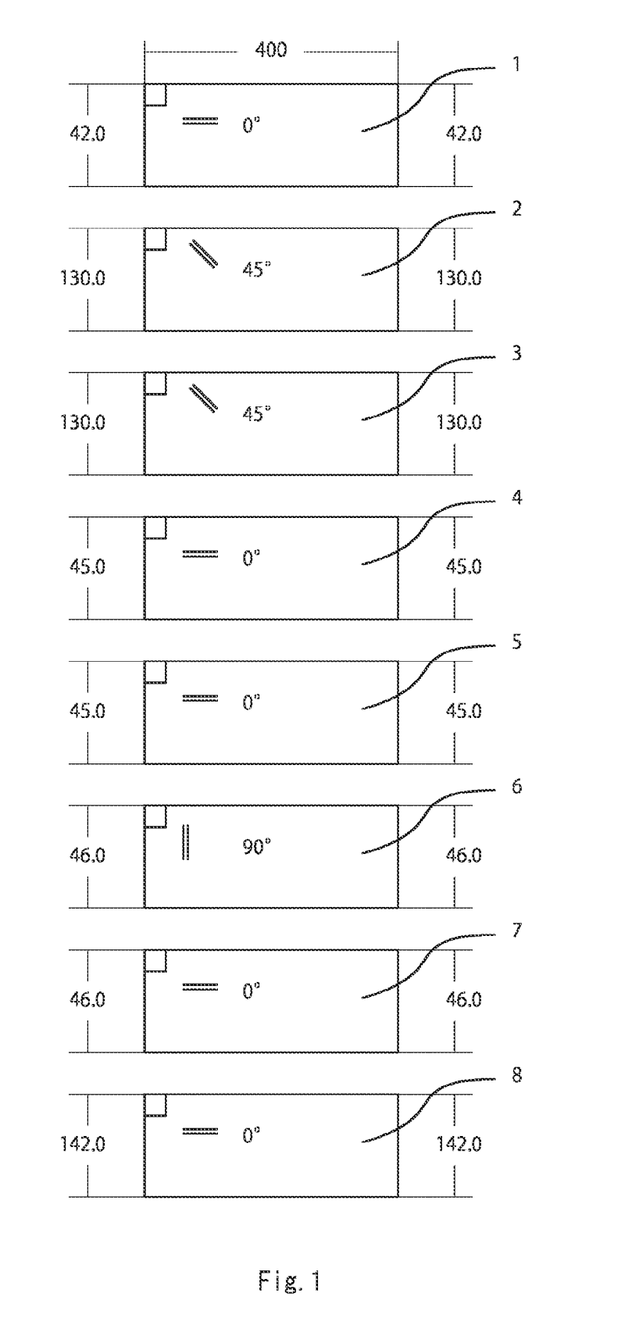
FIG. 1 shows a laminated construction of fiber-reinforced prepregs constituting a tubular body made of a fiber-reinforced epoxy resin material.
Figure 2:
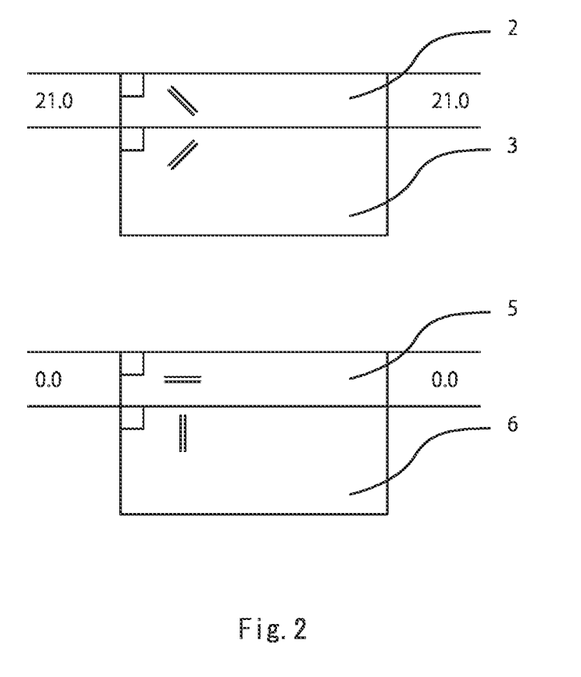
FIG. 2 shows an embodiment for laminating prepregs.

Tubular bodies made of a fiber-reinforced epoxy resin material were produced by a sheet winding method. Specifically, as shown in FIG. 1, prepregs 1 to 8 were wound around a core roller (mandrel) in order. The prepreg 1 forms an innermost layer, and the prepreg 8 forms an outermost layer. The prepregs 1, 4, 5, 7, and 8 are straight prepregs whose reinforcing fibers are arranged parallel to the axis of the tubular body. The prepregs 2 and 3 are bias prepregs whose reinforcing fibers are arranged so as to be tilted relative to the axis of the tubular body. The prepreg 6 is a hoop prepreg whose reinforcing fiber is arranged perpendicularly to the axis of the tubular body. As shown in FIG. 2, the prepreg 2 and the prepreg 3, and the prepreg 5 and the prepreg 6 were attached to each other such that the tilt directions of the reinforcing fibers thereof intersect each other. It is noted that as the prepreg 6, a commercially-available prepreg (Torayca prepreg P805S-3 manufactured by Toray Industries Inc.) was used. A tape was wound around the outer peripheral surface of the obtained wound body and heated to cause a curing reaction. The winding conditions and the curing conditions are shown below. In FIGS. 1 and 2, the dimensions are indicated by the unit of mm.

Winding Conditions:
  Rolling speed: 34 Hz
  Tape: PT-30H manufactured by Shin-Etsu Chemical Co., Ltd., tension 6000±100 gf
  Pitch: 2.0 mm
  Main shaft rotational speed: 1870 to 1890 Hz Curing Conditions:
  (1) Elevate the temperature from normal temperature to 80° C. in 30 minutes.
  (2) Keep at 80° C.±5° C. for 30 minutes±5 minutes.
  (3) Elevate the temperature from 80° C. to 130° C. in 30 minutes.
  (4) Keep at 130° C.±5° C. for 120 minutes±5 minutes.

[Swelling Test in Methyl Ethyl Ketone]

The above-obtained test piece for swelling test in methyl ethyl ketone (2 cm square, thickness: 2 mm) was immersed into 100 mL of methyl ethyl ketone and kept at 40° C. for 48 hours. The mass of the test piece was measured before and after the immersion, and the swelling ratio in methyl ethyl ketone was calculated based on the following.

Swelling ratio=100×[mass of test piece after swelling test−mass of test piece before swelling test]/mass of test piece before swelling test

[Tensile Test]

Figure 3:
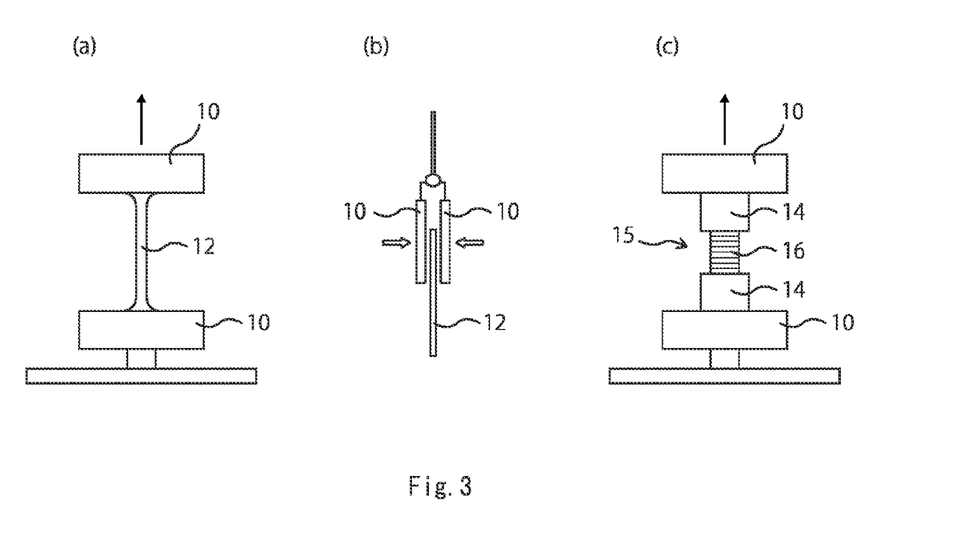
FIG. 3 illustrates an embodiment of a tensile test.

As shown in FIG. 3, a tensile test was conducted at a tension rate of 1 mm/min with a Shimadzu autograph manufactured by Shimadzu Corporation. FIG. 3 (a) schematically illustrates a tensile test method for a test piece 12 composed of a cured product of an epoxy resin composition. FIG. 3 (b) is a side view when chucks 10 pinching the test piece 12 in FIG. 3 (a) are seen from its side. It is noted that in FIG. 3 (b), recesses and projections for preventing slip are provided inside the chuck 10 but not shown. FIG. 3 (c) schematically illustrates a tensile test method for a fiber-reinforced epoxy resin material. In FIGS. 3 (a) and 3 (c), the arrow direction is a direction for the tensile test. As shown in FIG. 3 (c), aluminum tags 14 of 4 mm long×1.5 mm wide×0.5 mm thick were attached to a test piece 15 composed of a fiber-reinforced epoxy resin material, by means of a cyanoacrylate adhesive, and the tensile test was conducted in a direction perpendicular (90 degrees) to the direction of a reinforcing fiber 16. The strength of the cured product of the epoxy resin composition was indicated as maximum stress×elongation at maximum stress/2 (MPa·%).

[Three-Point Bending Test]

Figure 4:
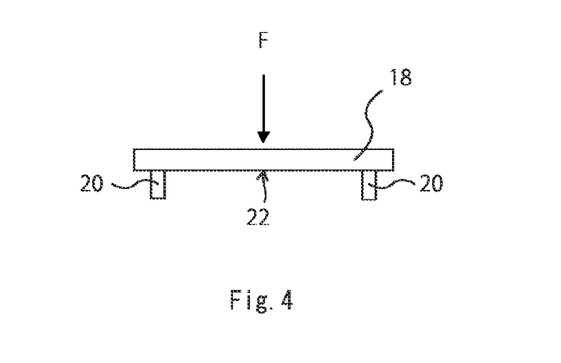
FIG. 4 illustrates and embodiment of a bending test.

As shown in FIG. 4, a tubular body 18 was supported at two points from its bottom such that the distance between fulcrums 20, 20 was 300 mm, a load F was applied at a midpoint 22 between the fulcrums from above the tubular body 18, and the load value (peak value) was measured when the tubular body was broken. It is noted that the midpoint 22 at which the load F was applied to the tubular body 18 was set to the center portion of the tubular body. The measurement was conducted under the following conditions.

Test apparatus: an autograph manufactured by Shimadzu Corporation
Loading rate: 20 mm/min

TABLE 1

| | Tubular body made of a fiber-reinforced epoxy resin material No. | | | | | | | |
|---|---|---|---|---|---|---|---|---|
| | 1 | 2 | 3 | 4 | 5 | 6 | 7 | 8 |
| jER828EL (epoxy equivalent 190) | 40 | 40 | 40 | 40 | 40 | 40 | 40 | 40 |
| jER1001 (epoxy equivalent 475) | — | — | — | — | — | — | — | — |
| jER1007 (epoxy equivalent 2000) | — | — | — | — | — | — | — | — |
| jER806 (epoxy equivalent 165) | — | — | — | — | — | — | — | — |
| jER4005P (epoxy equivalent 1070) | 41 | 41 | 41 | 41 | 41 | 41 | 41 | 41 |
| jER4007P (epoxy equivalent 2270) | — | — | — | — | — | — | — | — |
| jER154 (epoxy equivalent 180) | 0 | 2 | 4 | 7 | 10 | 13 | 18 | 20 |
| Total content of epoxy resin | 81 | 83 | 85 | 88 | 91 | 94 | 99 | 101 |
| Ratio of bisphenol A type/bisphenol F type | 0.98 | 0.98 | 0.98 | 0.98 | 0.98 | 0.98 | 0.98 | 0.98 |
| Content ratio of novolac type epoxy resin (%) | 0.0 | 2.4 | 4.7 | 8.0 | 11.0 | 13.8 | 18.2 | 19.8 |
| Total epoxy equivalent of bisphenol type | 326 | 326 | 326 | 326 | 326 | 326 | 326 | 326 |
| Epoxy equivalent of entire epoxy resin | 326 | 319 | 314 | 306 | 299 | 294 | 284 | 281 |
| Polyvinyl formal | 4 | 4 | 4 | 4 | 4 | 4 | 4 | 4 |
| Dicyandiamide | 4.5 | 4.7 | 4.9 | 5.2 | 5.5 | 5.8 | 6.3 | 6.5 |
| Urea derivative | 2.3 | 2.4 | 2.5 | 2.6 | 2.8 | 2.9 | 3.2 | 3.3 |
| Polyvinyl formal (ppH) *1 | 4.9 | 4.9 | 4.9 | 4.9 | 4.9 | 4.9 | 4.9 | 4.9 |
| Content of dicyandiamide (g/epoxy 1 mol) | 18.1 | 18.1 | 18.1 | 18.1 | 18.1 | 18.1 | 18.1 | 18.1 |
| Kinds of carbon fiber | T800SC | T800SC | T800SC | T800SC | T800SC | T800SC | T800SC | T800SC |
| Content ratio of carbon fiber (%) | 70 | 70 | 70 | 70 | 70 | 70 | 70 | 70 |
| MEK swelling ratio (wt %) | 45.6 | 42.5 | 37.1 | 32.5 | 27.3 | 23.6 | 19.6 | 13.2 |
| Epoxy resin composition tensile strength (MPa · %) | 70 | 92 | 110 | 117 | 116 | 103 | 86 | 68 |
| Fiber-reinforced epoxy resin material tensile strength (MPa) | 27 | 40 | 50 | 55 | 56 | 49 | 40 | 22 |
| Tubular body Three point bending strength (N) | 1930 | 2100 | 2210 | 2390 | 2370 | 2210 | 2050 | 1820 |

| | Tubular body made of a fiber-reinforced epoxy resin material No. | | | | | | |
|---|---|---|---|---|---|---|---|
| | 9 | 10 | 11 | 12 | 13 | 14 | 15 |
| jER828EL (epoxy equivalent 190) | 40 | 40 | 40 | 40 | 40 | — | — |
| jER1001 (epoxy equivalent 475) | — | — | — | — | — | 40 | — |
| jER1007 (epoxy equivalent 2000) | — | — | — | — | — | — | 40 |
| jER806 (epoxy equivalent 165) | — | — | — | — | — | — | — |
| jER4005P (epoxy equivalent 1070) | 41 | 41 | 41 | 41 | 41 | 41 | 41 |
| jER4007P (epoxy equivalent 2270) | — | — | — | — | — | — | — |
| jER154 (epoxy equivalent 180) | 7 | 7 | 7 | 7 | 7 | 7 | 7 |
| Total content of epoxy resin | 88 | 88 | 88 | 88 | 88 | 88 | 88 |
| Ratio of bisphenol A type/bisphenol F type | 0.98 | 0.98 | 0.98 | 0.98 | 0.98 | 0.98 | 0.98 |
| Content ratio of novolac type epoxy resin (%) | 8.0 | 8.0 | 8.0 | 8.0 | 8.0 | 8.0 | 8.0 |
| Total epoxy equivalent of bisphenol type | 326 | 326 | 326 | 326 | 326 | 661 | 1389 |
| Epoxy equivalent of entire epoxy resin | 306 | 306 | 306 | 306 | 306 | 545 | 905 |
| Polyvinyl formal | 0 | 2 | 6 | 10 | 20 | 4 | 4 |
| Dicyandiamide | 5.2 | 5.2 | 5.2 | 5.2 | 5.2 | 2.9 | 1.8 |
| Urea derivative | 2.6 | 2.6 | 2.6 | 2.6 | 2.6 | 1.5 | 0.9 |
| Polyvinyl formal (ppH) *1 | 0.0 | 2.5 | 7.4 | 12.3 | 24.7 | 4.9 | 4.9 |
| Content of dicyandiamide (g/epoxy 1 mol) | 18.1 | 18.1 | 18.1 | 18.1 | 18.1 | 18.0 | 18.5 |
| Kinds of carbon fiber | T800SC | T800SC | T800SC | T800SC | T800SC | T800SC | T800SC |
| Content ratio of carbon fiber (%) | 70 | 70 | 70 | 70 | 70 | 70 | 70 |
| MEK swelling ratio (wt %) | 30.5 | 31.3 | 32.0 | 30.1 | 28.1 | — | — |
| Epoxy resin composition tensile strength (MPa · %) | 69 | 102 | 107 | 93 | 63 | — | — |
| Fiber-reinforced epoxy resin material tensile strength (MPa) | 30 | 43 | 48 | 42 | 21 | — | — |
| Tubular body Three point bending strength (N) | 1910 | 2310 | 2290 | 2230 | 1890 | — | — |

Formulation: Parts by mass,
*1) ppH: parts by mass with respect to 100 parts by mass of epoxy resin

TABLE 2

| | Tubular body made of a fiber-reinforced epoxy resin material No. | | | | | | |
|---|---|---|---|---|---|---|---|
| | 16 | 17 | 18 | 19 | 20 | 21 | 22 |
| jER828EL (epoxy equivalent 190) | 40 | — | — | 40 | — | — | 40 |
| jER1001 (epoxy equivalent 475) | — | 40 | — | — | 40 | — | 41 |
| jER1007 (epoxy equivalent 2000) | — | — | 40 | — | — | 40 | — |
| jER806 (epoxy equivalent 165) | 41 | 41 | 41 | — | — | — | — |
| jER4005P (epoxy equivalent 1070) | — | — | — | — | — | — | — |
| jER4007P (epoxy equivalent 2270) | — | — | — | 41 | 41 | 41 | — |
| jER154 (epoxy equivalent 180) | 7 | 7 | 7 | 7 | 7 | 7 | 7 |
| Total content of epoxy resin | 88 | 88 | 88 | 88 | 88 | 88 | 88 |
| Ratio of bisphenol A type/bisphenol F type | 0.98 | 0.98 | 0.98 | 0.98 | 0.98 | 0.98 | 0.98 |
| Content ratio of novolac type epoxy resin (%) | 8.0 | 8.0 | 8.0 | 8.0 | 8.0 | 8.0 | 8.0 |
| Total epoxy equivalent of bisphenol type | 176 | 243 | 302 | 354 | 792 | 2128 | 273 |
| Epoxy equivalent of entire epoxy resin | 177 | 237 | 286 | 329 | 623 | 1144 | 262 |
| Polyvinyl formal | 4 | 4 | 4 | 4 | 4 | 4 | 4 |
| Dicyandiamide | 9.1 | 6.8 | 5.6 | 4.9 | 2.6 | 1.4 | 6.1 |
| Urea derivative | 4.5 | 3.4 | 2.8 | 2.4 | 1.3 | 0.7 | 3.1 |
| Polyvinyl formal (ppH) *1 | 4.5 | 4.5 | 4.5 | 4.5 | 4.5 | 4.5 | 4.5 |
| Content of dicyandiamide (g/epoxy 1 mol) | 18.3 | 18.3 | 18.3 | 18.3 | 18.4 | 18.2 | 18.2 |
| Kinds of carbon fiber | T800SC | T800SC | T800SC | T800SC | T800SC | T800SC | T800SC |
| Content ratio of carbon fiber (%) | 70 | 70 | 70 | 70 | 70 | 70 | 70 |
| MEK swelling ratio (wt %) | 28.6 | 30.1 | 30.5 | 31.1 | — | — | 27.1 |
| Epoxy resin composition tensile strength (MPa · %) | 95 | 103 | 104 | 106 | — | — | 78 |
| Fiber-reinforced epoxy resin material tensile strength (MPa) | — | 45 | 42 | 41 | — | — | 32 |
| Tubular body Three point bending strength (N) | — | 2210 | 2200 | 2210 | — | — | 1970 |

| | Tubular body made of a fiber-reinforced epoxy resin material No. | | | | | | |
|---|---|---|---|---|---|---|---|
| | 23 | 24 | 25 | 26 | 27 | 28 | 29 |
| jER828EL (epoxy equivalent 190) | — | 40 | 40 | 40 | 40 | 40 | 40 |
| jER1001 (epoxy equivalent 475) | — | — | — | — | — | — | — |
| jER1007 (epoxy equivalent 2000) | — | — | — | — | — | — | — |
| jER806 (epoxy equivalent 165) | 40 | — | — | — | — | — | — |
| jER4005P (epoxy equivalent 1070) | 41 | 41 | 41 | 41 | 41 | 41 | 41 |
| jER4007P (epoxy equivalent 2270) | — | — | — | — | — | — | — |
| jER154 (epoxy equivalent 180) | 7 | 7 | 7 | 7 | 7 | 7 | 7 |
| Total content of epoxy resin | 88 | 88 | 88 | 88 | 88 | 88 | 88 |
| Ratio of bisphenol A type/bisphenol F type | 0.98 | 0.98 | 0.98 | 0.98 | 0.98 | 0.98 | 0.98 |
| Content ratio of novolac type epoxy resin (%) | 8.0 | 8.0 | 8.0 | 8.0 | 8.0 | 8.0 | 8.0 |
| Total epoxy equivalent of bisphenol type | 289 | 326 | 326 | 326 | 326 | 326 | 326 |
| Epoxy equivalent of entire epoxy resin | 275 | 306 | 306 | 306 | 306 | 306 | 306 |
| Polyvinyl formal | 4 | 4 | 4 | 4 | 4 | 4 | 4 |
| Dicyandiamide | 5.8 | 5.2 | 0 | 2.6 | 10.4 | 20.8 | 5.2 |
| Urea derivative | 2.9 | 0 | 2.6 | 1.3 | 5.2 | 10.4 | 2.6 |
| Polyvinyl formal (ppH) *1 | 4.5 | 4.5 | 4.5 | 4.5 | 4.5 | 4.5 | 4.5 |
| Content of dicyandiamide (g/epoxy 1 mol) | 18.1 | 18.1 | 0.0 | 9.0 | 36.2 | 72.3 | 18.1 |
| Kinds of carbon fiber | T800SC | T800SC | T800SC | T800SC | T800SC | T800SC | M40JB |
| Content ratio of carbon fiber (%) | 70 | 70 | 70 | 70 | 70 | 70 | 70 |
| MEK swelling ratio (wt %) | 29.7 | 42.1 | — | 40.5 | 25.1 | 13.3 | 32.5 |
| Epoxy resin composition tensile strength (MPa · %) | 79 | 70 | — | 62 | 112 | 69 | 117 |
| Fiber-reinforced epoxy resin material tensile strength (MPa) | 30 | 20 | — | 21 | 51 | 31 | 50 |
| Tubular body Three point bending strength (N) | 1910 | 1790 | — | 1710 | 2290 | 1750 | 2030 |

Formulation: Parts by mass,
*1) ppH: parts by mass with respect to 100 parts by mass of epoxy resin The materials used in Tables 1 and 2 are as follows.

jER828EL: a bisphenol A type epoxy resin manufactured by Mitsubishi Chemical Corporation (epoxy equivalent: 184 to 194)

jER1001: a bisphenol A type epoxy resin manufactured by Mitsubishi Chemical Corporation (epoxy equivalent: 450 to 500)

jER1007: a bisphenol A type epoxy resin manufactured by Mitsubishi Chemical Corporation (epoxy equivalent: 1750 to 2200)

jER806: a bisphenol F type epoxy resin manufactured by Mitsubishi Chemical Corporation (epoxy equivalent: 160 to 170)

jER4005P: a bisphenol F type epoxy resin manufactured by Mitsubishi Chemical Corporation (epoxy equivalent: 1070)

jER4007P: a bisphenol F type epoxy resin manufactured by Mitsubishi Chemical Corporation (epoxy equivalent: 2270)

jER154: a phenolic novolac type epoxy resin manufactured by Mitsubishi Chemical Corporation (epoxy equivalent: 176 to 180)

Polyvinyl formal: Vinylec E manufactured by JNC Corporation

Dicyandiamide: DICY7 manufactured by Mitsubishi Chemical Corporation

Urea derivative: DCMU-99 (3-(3,4-dichlorophenyl)-1,1-dimethylurea) manufactured by Hodogaya Chemical Co., Ltd.

Methyl ethyl ketone: a product of YONEYAMA YAKUHIN KOGYO CO., LTD

Carbon fiber: Torayca T800SC manufactured by Toray Industries Inc. (tensile modulus: 30 t/mm$^2$)

Carbon fiber: M40JB manufactured by Toray Industries Inc. (tensile modulus: 40 t/mm$^2$)

The results of evaluation were shown in Tables 1 and 2. From Tables 1 and 2, it is recognized that the tubular bodies made of the fiber-reinforced epoxy resin material comprising the cured product of the epoxy resin composition and the reinforcing fiber, in which the swelling weight change of the cured product of the epoxy resin composition in methyl ethyl ketone ranges from 20 mass % to 40 mass %, have high three-point bending strength and tensile strength. The tubular bodies No. 9 and No. 13 are cases where the content of polyvinyl formal is not within the range from 2 parts by mass to 12 parts by mass with respect to 100 parts by mass of the epoxy resin. The strength properties thereof were slightly decreased. The tubular bodies No. 22 and No. 23 are cases where only bisphenol A type epoxy resin or bisphenol F type epoxy resin was used as a bisphenol type epoxy resin. It is recognized that the strength properties thereof were slightly decreased. It is noted that with regard to the tubular bodies Nos. 14, 15, 20, and 31, since the epoxy equivalent was high and the epoxy resin was not melt even by being heated, the curing agent was not able to be dispersed and a resin cured product was not able to be obtained. Thus, prepregs were not able to be produced. Moreover, with regard to the tubular body No. 25, since a curing agent (dicyandiamide) was not contained, a cured resin product was not able to be obtained.

The tubular body made of the fiber-reinforced epoxy resin material according to the present invention can be suitably used for, for example, a golf club shaft, a fishing rod, a tennis racket, a badminton racket, and the like. This application is based on Japanese Patent applications No. 2011-290328 filed on Dec. 29, 2011, the contents of which are hereby incorporated by reference.

The invention claimed is:

1. A tubular body made of a fiber-reinforced epoxy resin material comprising a cured product of an epoxy resin composition and a reinforcing fiber, wherein the cured product of the epoxy resin composition has a swelling ratio in a range from 20 mass % to 42.5 mass % in methyl ethyl ketone.

2. The tubular body made of the fiber-reinforced epoxy resin material according to claim 1, wherein the epoxy resin composition comprises, as an epoxy resin component, a novolac type epoxy resin, a bisphenol A type epoxy resin, and a bisphenol F type epoxy resin.

3. The tubular body made of the fiber-reinforced epoxy resin material according to claim 2, wherein a content ratio of the bisphenol A type epoxy resin to the bisphenol F type epoxy resin is from 20:80 to 80:20 in mass ratio, and an epoxy equivalent (g/eq) of bisphenol type epoxy resins ranges from 200 to 400.

4. The tubular body made of the fiber-reinforced epoxy resin material according to claim 2, wherein a content of the novolac type epoxy resin in the entire epoxy resin components ranges from 3% by mass to 19% by mass.

5. The tubular body made of the fiber-reinforced epoxy resin material according to claim 1, wherein the epoxy resin composition comprises dicyandiamide as a curing agent and a urea derivative as a curing accelerator.

6. The tubular body made of the fiber-reinforced epoxy resin material according to claim 1, wherein the epoxy resin composition further comprises a thermoplastic resin in an amount from 2 parts by mass to 12 parts by mass with respect to 100 parts by mass of the epoxy resin component.

7. The tubular body made of the fiber-reinforced epoxy resin material according to claim 6, wherein the epoxy resin composition comprises a polyvinyl formal as the thermoplastic resin.

8. The tubular body made of the fiber-reinforced epoxy resin material according to claim 1, wherein the epoxy resin composition comprises, as a curing agent, the dicyandiamide in an amount from 13 g to 40 g with respect to 1 mole of an epoxy group of the epoxy resin component.

9. The tubular body made of the fiber-reinforced epoxy resin material according to claim 1, wherein a content of the reinforcing fiber in the fiber-reinforced epoxy resin material ranges from 65 mass % to 85 mass %.

10. The tubular body made of the fiber-reinforced epoxy resin material according to claim 1, wherein the reinforcing fiber includes a carbon fiber.

11. The tubular body made of the fiber-reinforced epoxy resin material according to claim 1, wherein the reinforcing fiber has a tensile modulus ranging from 10 t/mm$^2$ to 70 t/mm$^2$.

12. A golf club shaft comprising a tubular body made of a fiber-reinforced epoxy resin material, wherein the fiber-reinforced epoxy resin material comprises a cured product of an epoxy resin composition and a reinforcing fiber, wherein the cured product of the epoxy resin composition has a swelling ratio in a range from 20 mass % to 42.5 mass % in methyl ethyl ketone.

13. The golf club shaft according to claim 12, wherein the epoxy resin composition comprises, as an epoxy resin component, a novolac type epoxy resin, a bisphenol A type epoxy resin, and a bisphenol F type epoxy resin.

14. The golf club shaft according to claim 13, wherein a content ratio of the bisphenol A type epoxy resin to the bisphenol F type epoxy resin is from 20:80 to 80:20 in mass ratio, and an epoxy equivalent (g/eq) of bisphenol type epoxy resins ranges from 200 to 400.

15. The golf club shaft according to claim 13, wherein a content of the novolac type epoxy resin in the entire epoxy resin components ranges from 3 mass % to 19 mass %.

16. The golf club shaft according to claim 12, wherein the epoxy resin composition comprises dicyandiamide as a curing agent and a urea derivative as a curing accelerator.

17. The golf club shaft according to claim 12, wherein the epoxy resin composition further comprises a thermoplastic resin in an amount from 2 parts by mass to 12 parts by mass with respect to 100 parts by mass of the epoxy resin component.

18. The golf club shaft according to claim 12, wherein the epoxy resin composition comprises, as a curing agent, the dicyandiamide in an amount from 13 g to 40 g with respect to 1 mole of an epoxy group of the epoxy resin component.

19. The golf club shaft according to claim 12, wherein a content of the reinforcing fiber in the fiber-reinforced epoxy resin material ranges from 65 mass % to 85 mass %.

20. The golf club shaft according to claim 12, wherein the reinforcing fiber has a tensile modulus ranging from 10 t/mm$^2$ to 70 t/mm$^2$.

\* \* \* \* \*